Figure 1:
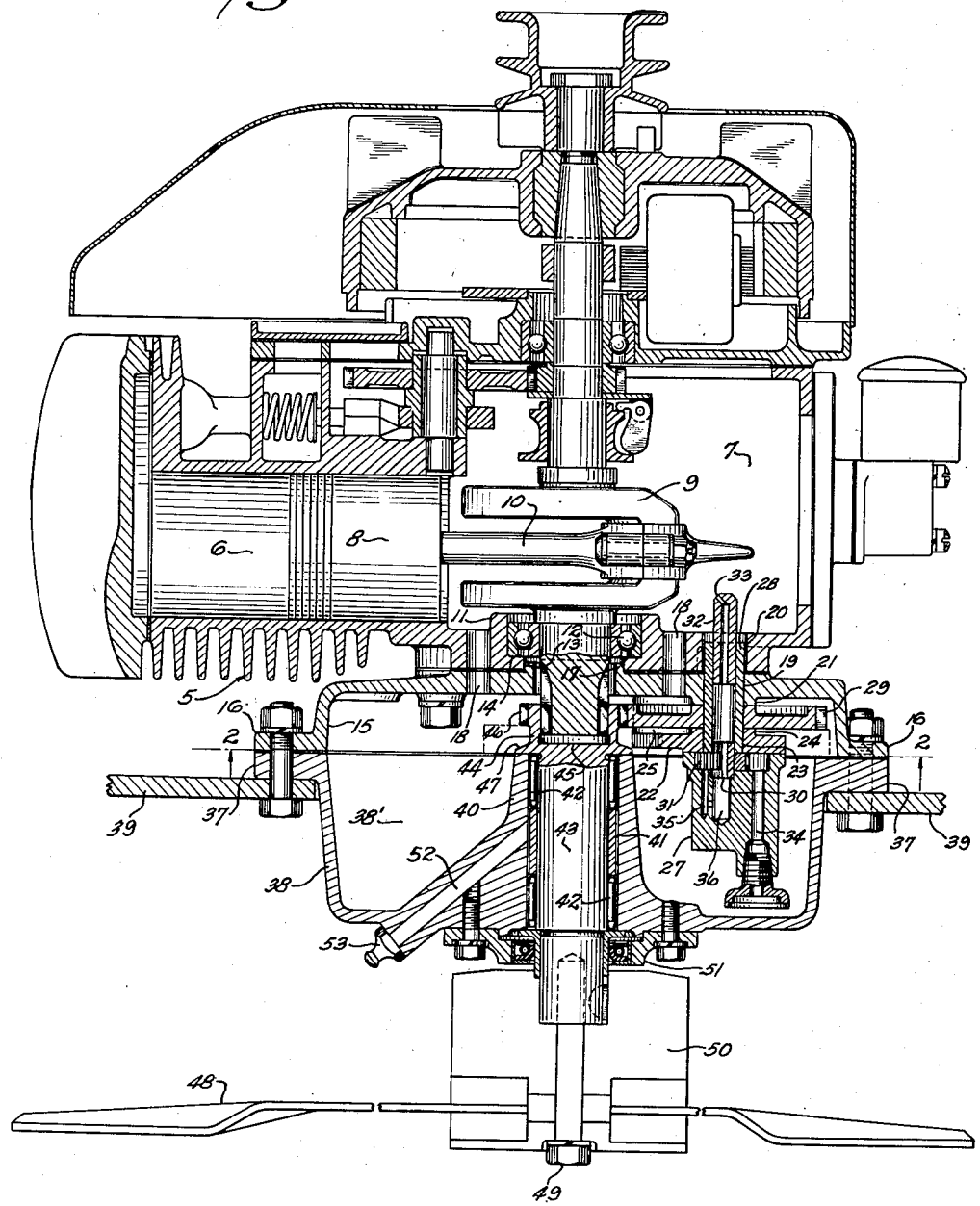

March 10, 1953     A. S. BOSMA     2,630,881
INTERNAL-COMBUSTION ENGINE CONSTRUCTION
Filed April 15, 1949     2 SHEETS—SHEET 2

INVENTOR.
Alfred S. Bosma,
BY Morsell & Morsell
ATTORNEYS.

Patented Mar. 10, 1953

2,630,881

UNITED STATES PATENT OFFICE 2,630,881

INTERNAL-COMBUSTION ENGINE CONSTRUCTION

Alfred S. Bosma, New Holstein, Wis., assignor to Hart-Carter Company, Peoria, Ill., a corporation of Delaware Application April 15, 1949, Serial No. 87,770

20 Claims. (Cl. 184—6)

This invention relates to improvements in internal combustion engine construction.

There are many applications wherein it is desirable to use an internal combustion engine having a vertically extending crankshaft connected to a vertically extending driven shaft for the purpose of transmitting power to a certain implement, fan blade, pump impeller, machine or other device requiring a drive of this type.

Since the pistons of this type of engine are horizontally disposed, a conventional splash type of lubrication system cannot be used. In addition, this type of engine must ordinarily be as compact as possible, while at the same time being so constructed as to effectively withstand any shock loads and/or vibration to which the driven member is subjected.

With the above in mind, it is therefore a general object of the invention to provide an improved construction for an internal combustion engine having a vertically extending crankshaft and having a vertically extending driven shaft wherein an annular oil sump is positioned below the crankcase and surrounding the driven shaft and into which oil can drain from the crankcase, said sump housing a gear type oil pump which is driven from said driven shaft.

Another object of the invention is to provide an engine construction of the class described wherein a relatively large driven shaft may be used and wherein the driven shaft and the crankshaft are connected in a manner to compensate for any misalignment thereof to thereby effectively prevent excessive wear on the engine due to shock loads and/or vibration to which the driven shaft is subjected.

Another object of the invention is to provide an engine construction of the class described having an upstanding boss formed in the bottom of the sump thereof and surrounding the driven shaft, said boss extending to a point near the level of the oil in said sump and forming a mounting for said driven shaft.

A further object of the invention is to provide an engine construction of the class described having a driven shaft formed at its upper end with an annular shoulder which rests on the upper end of the upstanding sump boss to vertically support said shaft, the upper end of said driven shaft also being formed with a recess having internal teeth for splined engagement with the crankshaft and being formed with external gear teeth which coact with the oil pump drive gear to drive said pump.

A further object of the invention is to provide a construction of the class described wherein the oil pump is mounted on the underside of the sump cover, said pump having a tubular drive shaft which rotatably extends through alined apertures in the sump cover and bottom of the crankcase and having an oil discharge nozzle which rotatably projects into the crankcase to intermittently direct oil at the engine crank pin during engine operation.

A further object of the invention is to provide an engine construction of the class described which is compact, which is easily assembled and disassembled, and which is otherwise well adapted for the purposes described.

With the above and other objects in view, the invention consists of the improved internal combustion engine construction, and all of its parts and combinations, as set forth in the claims, and all equivalents thereof.

Figure 2:
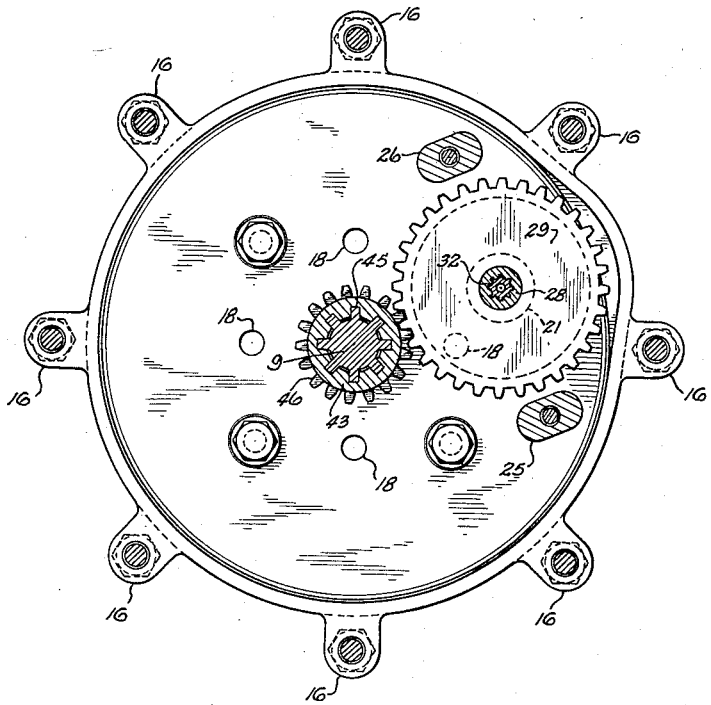

In the drawing accompanying and forming a part of this specification wherein is shown one complete embodiment of the preferred form of the invention, and wherein the same reference characters indicate the same parts in both of the views:

Fig. 1 is a vertical sectional view through an internal combustion engine embodying the improved construction; and Fig. 2 is a transverse sectional view taken approximately through the line 2—2 of Fig. 1.

Referring more particularly to Fig. 1 of the drawing, the numeral 5 indicates an engine block having a horizontally disposed cylinder 6 and having a crankcase 7. A piston 8 is slidably positioned in the cylinder 6 and is connected to a vertically extending crankshaft 9 by a connecting rod 10. The bottom of the crankcase 7 is formed with an upstanding boss 11 which is bored to receive the crankshaft and a lower crankshaft bearing 12. The bore of the boss 11 has a portion of reduced diameter 13 to form a shoulder 14 on which the bearing 12 rests.

A sump cover plate 15, which is generally circular in shape, having substantially vertical sidewalls and having a plurality of outwardly projecting apertured lugs 16, is bolted to the underside of the crankcase. The sump cover plate 15 is formed with an upstanding bored boss 17 which fits into the bore 13 of the crankcase and through which the lower end of the crankshaft 9 extends. It will be noted that the bore of the boss 17 is larger than the diameter of the portion of the crankshaft thereadjacent.

The bottom of the crankcase 7 and the sump cover plate are formed with alined drain openings 18, as well as with the alined openings 19 and 20, the latter being of slightly larger diameter than the former. The underside of the sump cover 15 is formed with a boss 21 surrounding the aperture 19 as shown in Fig. 1.

An oil pump mounting plate or bracket 22 extends horizontally and is spaced below the underside of the sump cover 15. The plate 22 is formed with a vertical aperture 23 which is coaxial with the aperture 19 in the cover 15. The plate 22 is formed with an upstanding boss 24 surrounding the aperture 23. The plate 22 is held in position by upstanding lugs 25 and 26 (see Fig. 2) formed at the ends thereof and bolted to the cover plate 15. A gear type oil pump 27 is fixed to the underside of the plate 22.

A tubular drive shaft 28 is rotatably positioned in the bores 19, 20 and 23, and fixed to said shaft between the bosses 21 and 24 is a pump drive gear 29. A sleeve 30 is preferably splined to the bore of one of the pump impeller gears 31 and to the lower end of the drive shaft 28. Fixedly positioned in the upper end of the drive shaft 28 is a tube 32 having its upper end closed and having said closed end formed with an angularly extending passage 33. The tube 32 forms a nozzle which rotates with the tubular drive shaft 28 during engine operation.

The oil pump 27 has an inlet passage 34 and an outlet passage 35. The outlet passage 35 extends downwardly and communicates with a bore 36 which, in turn, communicates with the bore of the sleeve 30 to provide a passage for oil under pressure to be delivered to the nozzle 32 through the drive shaft 28.

Bolted to the flanges 16 of the sump cover 15 are matching flanges 37 formed on a bowl-shaped sump or reservoir casing 38. The connecting bolts may also removably fix the entire engine, through the flanges 16 and 37, to a suitable supporting plate 39, as shown. The sump casing 38 is formed with a centrally disposed upstanding bearing boss 40 which is formed with an axial bore 41. The boss 40 forms an annular sump chamber 38' within the casing 38. The axis of the bore 41 is coincident with the axis of the crankshaft 9, and the boss 40 preferably extends substantially to the plane of the upper surface of the flange 37, as shown.

Positioned within the bore 41 of the boss 40 are suitable shaft bearings 42, and mounted for rotation in the bearings 42 is a relatively short driven shaft 43 having a relatively large diameter. The driven shaft 43 has an enlarged upper end 44 which is positioned above the upper end of the boss 40. The end portion 44 is formed with an end recess 45 having internal splines which engage external splines on the lower end of the crankshaft 9. The end portion 44 is also formed with external gear teeth 46 which engage the teeth of the oil pump drive gear 29, and with an outwardly projecting annular flange or shoulder 47 which engages the upper end of the boss 40. It is apparent that the driven shaft 43 is supported against lateral or axial downward movement by the boss 40 and the bearings 42.

The driven shaft 43 extends downwardly below the sump casing 38 and may be suitably connected to a device to be driven thereby. Fig. 1 shows a horizontal type lawn mower blade 48 connected to the shaft 43 by suitable means including a bolt 49 and a hub 50, the latter being keyed to the shaft 43. A suitable bearing cap and shaft seal assembly 51 may surround the shaft 43 at the underside of the sump casing 38 and be bolted to said casing as shown. A suitable passage 52 may be formed in the casing 38 to communicate between the bore 41 and an exterior lubricant fitting 53.

Operation of the engine causes rotation of the crankshaft 9 and of the driven shaft 43 splined thereto. The shaft 43, through the gear teeth 46, drives the oil pump drive gear 29 which, in turn, rotates the tubular drive shaft 28, the tube 32, and the impeller gear 31. Rotation of the intermeshing oil pump impeller gears causes lubricating oil to be drawn from the sump 38' into the inlet passage 34 and forces said oil out the outlet passage 35. This oil under pressure passes into the bore 36, through the sleeve 30, through the bore of the drive shaft 28, and tube 32, and is discharged out of the passage 33.

When the tube or nozzle 32 is in the position of Fig. 1 it directs a stream of lubricating oil at the crankpin of the crankshaft 9. However, since the nozzle 32 is rotating with the oil pump drive shaft 28 during engine operation, it directs oil at the crankpin only intermittently, i. e., once each revolution. Sufficient lubrication is obtained by this construction, and the operation is much more economical than if oil were continuously directed at the crankpin.

The oil in the crankcase 7 flows back to the sump 38' through the apertures 18, and since one of the apertures 18 drains oil onto the gear 29, sufficient lubrication is provided for said gear and the gear teeth 46 meshing therewith, as well as for the splined connection between the crankshaft 9 and the driven shaft 43. The level of the lubricating oil in the sump is preferably below the upper end of the boss 40.

It is apparent that the improved construction provides a very compact engine which is easily assembled or disassembled. By merely removing the sump casing 38 from the cover plate 15 the driven shaft 43 can be disengaged from the crank shaft and the pump drive gear 29. The novel mounting of the driven shaft within the sump casing 38, and the toothed connection of said shaft at its upper end with both the crankshaft and the oil pump drive gear not only makes for compactness and ease of assembly and disassembly, but it has other marked advantages. Among these advantages are the fact that a relatively large driven shaft may be used, thereby increasing the shock load which said shaft will withstand. The splined connection compensates for any misalignment between the crankshaft and the driven shaft and reduces vibration which would otherwise result during operation.

Various changes and modifications may be made without departing from the spirit of the invention, and all of such changes are contemplated, as may come within the scope of the claims.

What I claim is:

1. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects; an upstanding vertically bored boss formed in the bottom of said reservoir and projecting to the upper portion thereof; and a driven shaft rotatably mounted in said boss, said driven shaft having a toothed driving connection with said crankshaft above said boss, said connection being disengageable by relative movement axially of said shafts, and said driven shaft having shoulder means supported on an upper end portion of said boss to support said driven shaft against vertical downward movement, said driven shaft also having a lower end portion accessible from below the reservoir for connection with an element to be driven thereby.

2. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects; an upstanding vertically bored boss formed in the bottom of said reservoir and projecting to the upper portion thereof; and a driven shaft rotatably mounted in said boss, said driven shaft having a driving connection with said crankshaft above said boss, and said driven shaft being formed with an annular shoulder supported on the upper end of said boss to prevent vertical downward movement of said driven shaft, said shaft also having a lower end portion projecting below the reservoir for connection with an element to be driven thereby.

3. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects; a centrally disposed, upstanding, vertically bored boss formed in the bottom of said reservoir and projecting to the upper portion thereof; and a driven shaft rotatably mounted in said boss, said driven shaft having a splined connection with said crankshaft above said boss, and said driven shaft having shoulder means in engagement with the upper end of said boss to support said driven shaft against vertical downward movement, said driven shaft also having a lower end portion projecting below the reservoir for connection with an element to be driven thereby.

4. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects, said reservoir being separable into a bowl portion and a cover portion; an oil pump in said reservoir mounted on said cover portion and having a drive gear; an upstanding vertically bored boss formed in the bottom of said bowl portion; and a driven shaft rotatably mounted in said boss, said driven shaft having a toothed connection with said crankshaft and with said oil pump drive gear above said boss, said toothed connections being disengagable by relative movement axially of said shafts, whereby removal of the bowl portion of the reservoir from the cover portion thereof permits simultaneous disengagement of the driven shaft from the crankshaft and said oil pump drive gear.

5. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects, said reservoir being separable into a bowl portion and a cover portion; a centrally disposed, upstanding, vertically bored boss formed in the bottom of said bowl portion and projecting to the upper portion thereof; and a driven shaft rotatably mounted in said boss, said driven shaft having shoulder means in engagement with the upper end of said boss to support said driven shaft against vertical downward movement, and said driven shaft having a splined connection with said crankshaft above said boss, whereby removal of the bowl portion of the reservoir from the cover portion thereof permits simultaneous disengagement of the driven shaft from the crankshaft.

6. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects, said reservoir being separable into a bowl portion and a cover portion; an upstanding vertically bored boss formed in the bottom of said bowl portion and projecting to the upper portion thereof; an oil pump mounted in said reservoir and having a drive gear; and a driven shaft rotatably mounted in said boss, said driven shaft having a splined connection with said crankshaft above said boss and being formed with external gear teeth adjacent said splined connection in driving engagement with said pump drive gear, the connections between the driven shaft and said crankshaft and oil pump gear being disengageable by relative movement axially of said shafts, whereby removal of the bowl portion of the reservoir from the cover portion thereof permits simultaneous disengagement of the driven shaft from the crankshaft and from said oil pump gear.

7. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects, said reservoir being separable into a bowl portion and a cover portion; an upstanding vertically bored boss formed in the bottom of said bowl portion and projecting to the upper portion thereof; an oil pump in said reservoir fixed to the cover portion thereof and having a drive gear; and a driven shaft rotatably mounted in said boss, said driven shaft having a splined connection with said crankshaft above said boss and being formed with external gear teeth adjacent said splined connection in driving engagement with said pump drive gear, said driven shaft also being formed with an annular shoulder in engagement with the upper end of said boss to support said driven shaft against vertical downward movement, the connections between the driven shaft and said crankshaft and oil pump gear being disengageable by relative movement axially of said shafts, whereby removal of the bowl portion of the reservoir from the cover portion thereof permits simultaneous disengagement of the driven shaft from the crankshaft and from said oil pump gear.

8. In an internal combustion engine having a crankcase, a vertically extending crankshaft mounted in said crankcase and having an externally splined lower end portion projecting through the bottom wall thereof; an oil reservoir below said crankcase and into which the lower end portion of the crankshaft projects, said reservoir being separable into a bowl portion and a cover portion; an upstanding vertically bored boss formed in the bottom of said bowl portion and projecting to the upper portion thereof; an oil pump mounted in said reservoir and having a drive gear and a driven shaft rotatably mounted in said boss, said driven shaft at its upper end having an internally splined recess in which the lower end of said crankshaft is removably positioned and said driven shaft at its upper end also being formed with external gear teeth and with an external annular shoulder, said shoulder being positioned in engagement with the upper end of said boss to support said driven shaft against vertical downward movement, and said external gear teeth drivingly engaging said pump drive gear, the connections between the driven shaft and said crankshaft and oil pump gear being disengageable by relative movement axially of said shafts, whereby removal of the bowl portion of the reservoir from the cover portion thereof permits simultaneous disengagement of the driven shaft from the crankshaft and from said oil pump gear.

9. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects; a gear type oil pump mounted in said reservoir and having a tubular drive shaft through which said pump discharges oil, said drive shaft having a nozzle at one end which rotatably projects into said crankcase to intermittently direct a stream of oil at said crankshaft during operation; and a driven shaft rotatably mounted in said reservoir and having a driving connection with said crankshaft and with said oil pump drive shaft in said reservoir, said connections being disengageable by relative movement axially of said shafts, said driven shaft also having a lower end portion projecting below the reservoir for connection with an element to be driven thereby.

10. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects; a gear type oil pump mounted in said reservoir and having a tubular drive shaft through which said pump discharges oil, said drive shaft having a nozzle at one end which rotatably projects into said crankcase, said nozzle being formed with an angularly disposed discharge passage for directing a stream of oil at said crankshaft when said passage is alined therewith; and a driven shaft rotatably mounted in said reservoir and having a driving connection with said crankshaft and with said oil pump drive shaft in said reservoir, said connections being disengageable by relative movement axially of said shafts, said driven shaft also having a lower end portion projecting below the reservoir for connection with an element to be driven thereby.

11. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects; an upstanding vertically bored boss formed in the bottom of said reservoir and projecting to the upper portion thereof; a gear type oil pump mounted in said reservoir and having a tubular drive shaft having a nozzle at one end which rotatably projects into said crankcase to intermittently direct a stream of oil at said crankshaft during operation; and a driven shaft rotatably mounted in the reservoir boss, said driven shaft having a driving connection with said crankshaft and with said oil pump drive shaft above said boss, said connections being disengageable by relative movement axially of said shafts, and said driven shaft having a lower end portion projecting below the reservoir for connection with an element to be driven thereby.

12. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects; an upstanding vertically bored boss formed in the bottom of said reservoir and projecting to the upper portion thereof; a gear type oil pump mounted in said reservoir and having a tubular drive shaft having a nozzle at one end which rotatably projects into said crankcase, said nozzle being formed with an angularly disposed discharge passage for directing a stream of oil at said crankshaft when said passage is alined therewith; and a driven shaft rotatably mounted in the reservoir boss, said driven shaft having a driving connection with said crankshaft and with said oil pump drive shaft above said boss, said connections being disengageable by relative movement axially of said shafts, and said driven shaft having a lower end portion projecting below the reservoir for connection with an element to be driven thereby.

13. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects; an upstanding vertically bored boss formed in the bottom of said reservoir and projecting to the upper portion thereof; a gear type oil pump mounted in said reservoir and having a tubular drive shaft having a nozzle at one end which rotatably projects into said crankcase to intermittently direct a stream of oil at said crankshaft during operation; an oil pump drive gear fixed to said tubular drive shaft; and a driven shaft rotatably mounted in the reservoir boss, said driven shaft having a splined connection with said crankshaft above said boss and being formed with external gear teeth adjacent said splined connection in driving engagement with said pump drive gear, and said driven shaft also having a lower end portion projecting below the reservoir for connection with an element to be driven thereby.

14. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects; an upstanding vertically bored boss formed in the bottom of said reservoir and projecting to the upper portion thereof; a gear type oil pump mounted in said reservoir and having a tubular drive shaft having a nozzle at one end which rotatably projects into said crankcase, said nozzle being formed with an angularly disposed discharge passage for directing a stream of oil at said crankshaft when said passage is alined therewith; an oil pump drive gear fixed to said tubular drive shaft; and a driven shaft rotatably mounted in the reservoir boss, said driven shaft having a splined connection with said crankshaft above said boss and being formed with external gear teeth adjacent said splined connection in driving engagement with said pump drive gear, and said driven shaft also having a lower end portion projecting below the reservoir for connection with an element to be driven thereby.

15. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects, said reservoir being separable into a bowl portion and a cover portion; an upstanding vertically bored boss formed in the bottom of said bowl portion and projecting to the upper portion thereof; a gear type oil pump in said reservoir fixed to the cover portion thereof and having a tubular drive shaft which projects through said cover and a portion of the bottom wall of the crankcase, said drive shaft having a nozzle at its upper end which rotatably projects into said crankcase to intermittently direct a stream of oil at said crankshaft during operation; an oil pump drive gear fixed to said tubular drive shaft; and a driven shaft rotatably mounted in the reservoir boss, said driven shaft having a splined connection with said crankshaft above said boss and being formed with external gear teeth adjacent said splined connection in drive engagement with said oil pump drive gear, said driven shaft also being formed with an annular shoulder in engagement with the upper end of said boss to support said driven shaft against vertical downward movement, and said driven shaft also having a lower end portion projecting below the reservoir for connection with an element to be driven thereby, the connections between the driven shaft and said crankshaft and oil pump gear being disengageable by relative movement axially of said shafts, whereby removal of the bowl portion of the reservoir from the cover portion thereof permits simultaneous disengagement of the driven shaft from the crankshaft and from said oil pump drive gear.

16. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects, said reservoir being separable into a bowl portion and a cover portion; an upstanding vertically bored boss formed in the bottom of said bowl portion and projecting to the upper portion thereof; a gear type oil pump in said reservoir fixed to the cover portion thereof and having a tubular drive shaft which projects through said cover and a portion of the bottom wall of the crankcase, said drive shaft having a nozzle at its upper end which rotatably projects into said crankcase, said nozzle being formed with an angularly disposed discharge passage for directing a stream of oil at said crankshaft when said passage is alined therewith to intermittently direct a stream of oil at said crankshaft during operation, an oil pump drive gear fixed to said tubular drive shaft; and a driven shaft rotatably mounted in the reservoir boss, said driven shaft having a splined connection with said crankshaft above said boss and being formed with external gear teeth adjacent said splined connection in driving engagement with said oil pump drive gear, said driven shaft also being formed with an annular shoulder in engagement with the upper end of said boss to support said driven shaft against vertical downward movement, and said driven shaft also having a lower end portion projecting below the reservoir for connection with an element to be driven thereby, the connections between the driven shaft and said crankshaft and oil pump gear being disengageable by relative movement axially of said shafts, whereby removal of the bowl portion of the reservoir from the cover portion thereof permits simultaneous disengagement of the driven shaft from the crankshaft and from said oil pump drive gear.

17. In an internal combustion engine having a crankcase; a vertically extending crankshaft mounted in said crankcase and having its lower end portion projecting through the bottom wall of the crankcase; an oil reservoir below said crankcase and into which the lower end portion of the crankshaft projects; an upstanding vertically bored boss formed in the bottom of said reservoir and projecting to the upper portion thereof; and a driven shaft rotatably mounted in said boss, said driven shaft having a driving connection with said crankshaft, and said driven shaft having shoulder means supported on an upper end portion of said boss to support said driven shaft against vertical downward movement, said driven shaft also having a lower end portion accessible from below the reservoir for connection with an element to be driven thereby.

18. In an internal combustion engine having a crankcase; a vertically extending crankshaft mounted in said crankcase and having its lower end portion projecting through the bottom wall thereof; an oil reservoir below said crankcase into which the lower end portion of the crankshaft projects, said reservoir being separable into a bowl portion and a cover portion; an oil pump in said reservoir mounted on said cover; an upstanding vertically bored boss formed in the bottom of said bowl portion; and a driven shaft rotatably mounted in said boss; said driven shaft having a driving connection with said crankshaft and with said oil pump above said boss, said driving connection being of a type which is disengageable by relative movement axially of said shafts, whereby removal of the bowl portion of the reservoir from the cover portion causes simultaneous disengagement of the driven shaft from the crankshaft and oil pump drive gear.

19. In an internal combustion engine: a crankcase having a bottom wall; an oil reservoir below said crankcase, said reservoir having a separable bowl portion; a vertically extending crankshaft mounted in the crankcase and having its lower end portion projecting through the bottom wall of the crankcase and into the oil reservoir; an oil pump unit mounted in the reservoir, said oil pump unit including: an oil pump having a tubular drive shaft projecting vertically upwardly therefrom through which said pump discharges oil, and a drive gear on said drive shaft, said drive shaft having a nozzle at its upper end rotatably and axially slidably projecting through the bottom wall of the crankcase into said crankcase; and a driving connection in said reservoir between said crankshaft and oil pump drive gear, said driving connection being of the type which is disengageable by axial movement of said drive gear, whereby removal of the bowl portion of the reservoir permits removal of the oil pump unit from the engine by downward movement of said unit axially of said drive gear, said movement causing disengagement of the driving connection and withdrawal of the nozzle from the crankcase.

20. In an internal combustion engine having a crankcase, a vertically extending crankshaft mounted in said crankcase and having its lower end portion projecting through the bottom wall thereof; an oil reservoir below said crankcase and into which the lower end portion of the crankshaft projects, said reservoir being separable into a bowl portion and a cover portion; a centrally disposed, upstanding, vertically bored boss formed in the bottom of said bowl portion and projecting to the upper portion thereof; and a driven shaft rotatably mounted in said boss, said driven shaft having shoulder means in engagement with the upper end of said boss to support said driven shaft against vertical downward movement, and said driven shaft having a splined connection with said crankshaft whereby removal of the bowl portion of the reservoir from the cover portion thereof permits simultaneous disengagement of the driven shaft from the crankshaft.

ALFRED S. BOSMA.

REFERENCES CITED

The following references are of record in the file of this patent:

UNITED STATES PATENTS

| Number | Name | Date |
|---|---|---|
| 1,844,386 | Harris | Feb. 9, 1932 |
| 2,152,607 | Schmitter | Mar. 28, 1939 |
| 2,225,228 | Neeson | Dec. 17, 1940 |
| 2,346,148 | Bosma | Apr. 11, 1944 |
| 2,431,806 | Karey | Dec. 2, 1947 |

FOREIGN PATENTS

| Number | Country | Date |
|---|---|---|
| 158,648 | Great Britain | Feb. 7, 1921 |
| 647,987 | France | Aug. 6, 1928 |